March 22, 1955     J. F. EGAN     2,704,485
APPARATUS FOR PHOTOGRAPHICALLY COPYING
BOTH SIDES OF A DOCUMENT
Filed Dec. 24, 1953
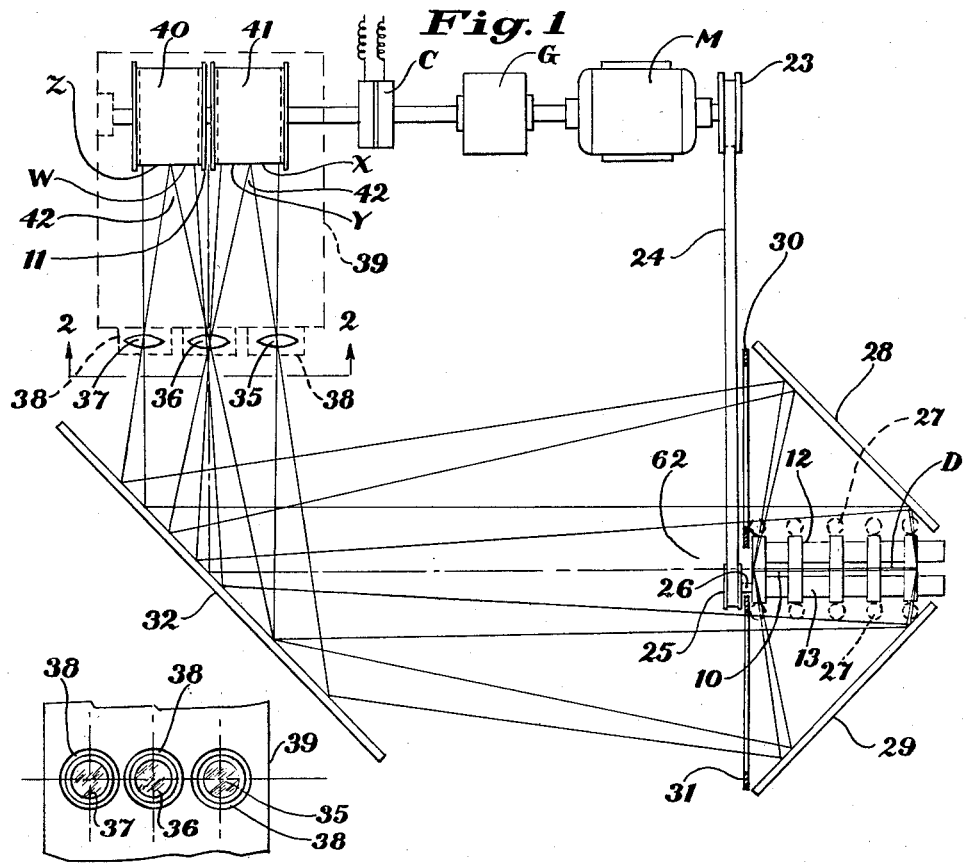
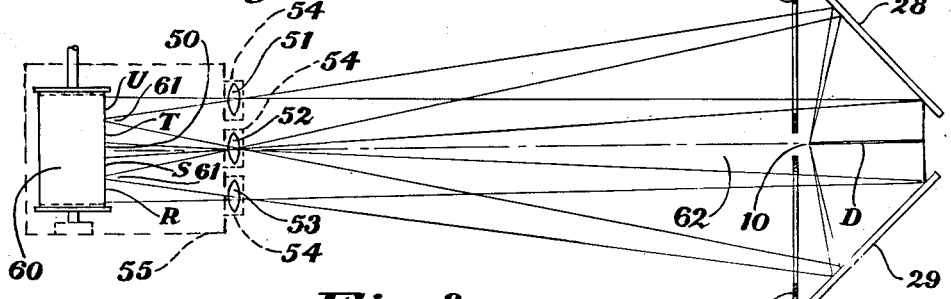
John F. Egan
INVENTOR.
BY Daniel I. Mayne
George A. Gillett, Jr.
ATTORNEYS

United States Patent Office 2,704,485
Patented Mar. 22, 1955

2,704,485

APPARATUS FOR PHOTOGRAPHICALLY COPYING BOTH SIDES OF A DOCUMENT

John F. Egan, Rochester, N. Y., assignor to Eastman Kodak Company, Rochester, N. Y., a corporation of New Jersey Application December 24, 1953, Serial No. 400,182

3 Claims. (Cl. 88—24)

This invention relates to photographic copying apparatus and more particularly to apparatus in which the obverse and the reverse sides of a document are simultaneously photographed and the images recorded in side by side relation on each of two parallel light sensitive recording areas.

As is well known in duplex type continuous photographic copying machines, the document is continuously moved through an exposure station where both sides of the document are illuminated and the reflected image of each side of the document is directed by mirrors to the photographing station where the images are recorded in side by side relationship on a continuously moving light sensitive recording means. A disadvantage of the known prior art duplex type photographic copying machines is that in order to have relatively small spacing between the obverse and reverse images on the recording film strip, the image reflecting mirrors at one end are positioned very close to the document and document guide plates. The mirrors thus arranged interfere with the document illuminating means with the result that the document can not be properly and evenly illuminated throughout its length. Furthermore, the mirrors being in such close proximity to the document require frequent removal and cleaning to eliminate the paper dust and lint which accumulates on the mirror faces. An alternative construction is to provide widely spaced mirrors, but this is unsatisfactory because of the increased distance between the obverse and reverse images on the film recording strip which constitutes a substantial expense in unuseable film.

In the present invention a three-lens system hereinafter disclosed, used in conjunction with widely spaced mirrors and parallel film strips or a single relatively wide film strip avoids all of the above enumerated disadvantages of the prior art machines. The widely spaced mirrors permit the driving chains, gears and glass guides to be positioned between the mirrors or between the mirrors and recording film strip without interfering with illumination of the document.

The primary object of the present invention is, therefore, to provide a photographic copying apparatus in which a duplicate record of the images of the obverse and reverse sides of a document is simultaneously made in side by side non-overlapping relation on light-sensitive recording means.

A further object is to provide a photographic copying apparatus in which the images forming a duplicate record of the obverse and reverse sides of the document are transmitted by a system of three lenses to the light sensitive recording means in side by side non-overlapping relation thereon.

A still further object is to provide a photographic copying apparatus in which relatively widely spaced mirrors may be utilized to reflect the obverse and reverse images of the document to light-sensitive recording means on which the distance between the recorded images is relatively small.

Other objects and advantages will become apparent to those skilled in the art from the following description with reference to the drawings wherein like reference characters denote like parts and wherein:

Fig. 1 is a plan view of the photographic copying apparatus illustrating one embodiment of my invention;

Fig. 2 is a front elevation view showing a section taken along line 2—2 of Fig. 1 in front of the camera used in the photographic copying apparatus and showing the aligned relationship of the three lenses; and Fig. 3 is a plan view illustrating another embodiment of my invention and showing only the photographing station, the exposure station, the reflecting mirrors, and the lens relationships in a photographic copying apparatus.

According to the invention, the apparatus as shown in Fig. 1 includes a photographing station 10 comprising the plane in which the document D is copied, and an exposure station 11 which lies in a plane parallel to the plane of the photographing station. The document D having obverse and reverse sides to be photographed, is advanced through the photographing station 10 by the document advancing means comprising rollers 12 and 13 which are frictionally driven together for simultaneous movement by motor M driving the roller 13 through pulley 23, belt 24, and pulley 25, all of which is well known in the art. Pulley 25 is rigidly connected to shaft 26 which is shown as an integral part of roller 13.

Light from the lamps 27 illuminates the document D in the photographing station 10. Relatively widely spaced mirrors 28 and 29 lie in planes oblique to and on opposite sides of the plane of the photographing station 10 and reflect the obverse and reverse images of the document D through apertured plates 30 and 31 to the directing mirror 32 positioned between mirrors 28 and 29 and the exposure station 11 and which directs the reflected images to the exposure station 11.

The exposure station 11 comprises the focal planes of a three-lens system embodying lenses 35, 36 and 37 which are mounted in lens mounts 38 on camera 39. Parallel light-sensitive recording means indicated in the drawing as film strips 40 and 41 move together in the focal plane of the lenses by virtue of the motion imparted by motor M through reduction gear box G and a magnetic clutch C in a direction opposite to that of the document D in the photographing station 10. Assuming mirror 28 reflects the obverse image; that is, an image of the obverse side of the document D, and that mirror 29 reflects the reverse image; that is, an image of the reverse side of the document D, it will be readily apparent that film strip 41 records an image at X of the reverse side of the document D which is transmitted by lens 35 and an image at Y of the obverse side of the document D which is transmitted by lens 36. Similarly, film strip 40 records an image at W of the reverse side of the document D which is transmitted by lens 36 and an image at Z of the obverse side of the document D which is transmitted by lens 37.

It will be obvious to those skilled in the art that the widely spaced mirrors may be efficiently utilized through the use of the three-lens system disclosed. By properly spacing lenses 35 and 37 from lens 36 a minimum amount of space 42 between the obverse and reverse images on the film strips 40 and 41 is obtained. The total width of the available image area; that is, the areas of the film strips which record images when the largest document for which the machine is designed is being photographed, is equal to the sum of the widths of the images at W, X, Y and Z. Since the space 42 between the images is relatively small, the total width of the available image area is only slightly less than the total width of the film strips 40 and 41 and only a minimum amount of film area is unused.

Fig. 2 shows the aligned relationship of lenses 35, 36 and 37 mounted in the lens mounts 38 of camera 39. Lenses 35, 36 and 37 all lie in a common plane which is parallel to the plane of the photographing station 10. The optical axis of each lens is parallel to the optical axes of the other lenses and the optical axes of all three lenses lie in a common plane which is perpendicular to the planes of the photographing station 10 and the exposure station 11.

In Fig. 3 I have disclosed another embodiment of my invention wherein the directing mirror 32 of Fig. 1 is eliminated. In Fig. 3 I have not illustrated details such as, for example, the lamps 27, document advancing rollers 12 and 13, and motor M, as shown in Fig. 1, the location of these parts being well known by those skilled in the art and forming no part of the present invention.

In the embodiment of Fig. 3, document D is moved as was stated in regard to Fig. 1 through photographing station 10. Relatively widely spaced mirrors 28 and 29 lie in planes oblique to and on opposite sides of the plane of the photographing station 10 and reflect the obverse and reverse images of document D to the exposure station 50. The exposure station 50 comprises the focal planes of a three-lens system embodying lenses 51, 52 and 53 which are mounted in lens mounts 54 on camera 55. Light-sensitive recording means indicated on the drawing as a single relatively wide film strip 60 in exposure station 50 moves simultaneously and in a direction opposite to the direction of the movement of document D in the photographing station 10, by means well known and conventional in the art. The film strip 60 receives and records the images of the document D which are transmitted by the lenses 51, 52 and 53. The optical axes of lenses 51, 52 and 53 lie in a common plane which is perpendicular to the planes of the photographing station 10 and the exposure station 11. The optical axes of lens 52 lies in the plane of the photographing station and is parallel to the optical axes of lenses 51 and 53.

Assuming mirror 28 reflects an obverse image of the document D it will be apparent that the lenses 51 and 52 will transmit the obverse image to the film strip 60 where it is recorded at U and S respectively. Similarly, the reverse image of the document D which is reflected by mirror 29 is transmitted by lenses 53 and 52 to the film strip 60 on which it is recorded at R and T respectively. Thus by properly spacing lenses 51 and 53 from lens 52, a minimum amount of space 61 between the obverse and reverse images on the film strip 60 is obtained. As was explained in regard to Fig. 1, the total width of the available image area, equal to the sum of the widths of the images at R, S, T and U, is only slightly less than the total width of the film strip 60, because of the relatively small space 61 between the recorded images on the film strip. Thus only a minimum amount of film area is unused. After the film strip 60 has recorded the images of the documents passed through the photographing station, it may be split into halves by any well-known manner to thereby provide two separate duplicate records.

Since in both embodiments mirors 28 and 29 are relatively widely spaced from the photographing station 10, lint and paper dust is less likely to accumulate on the mirrors than in the conventional duplex type photographic copying machines. Whereas in prior duplex type photographic copying machines the end of the document nearest to the mirror faces usually received less light than the remainder of the document because of mirror interference with the light, my invention utilizing the three-lens system disclosed allows the mirrors 28 and 29 to be positioned outside of the lamps with the result that the document is uniformly illuminated throughout its length and a clearly readable record is made. Also, a relatively wide clear space 62 is obtained in which such parts as glass guides, driving chains, driving gears and frame casting may be located without interfering with the reflected images from mirrors 28 and 29.

Thus it will be appreciated that I have disclosed a photographic copying apparatus having not only the distinct advantages illustrated supra but also capable of simultaneously reproducing through three aligned lenses a double record of the obverse and reverse sides of a document in side by side non-overlapping relation on a single wide film strip or on parallel film strips.

Other modifications will be readily apparent to those skilled in the art such as, for example, the utilizing of the disclosed invention in intermittent copying apparatus and therefore the present disclosure is illustrative only and the scope of the invention is defined by the appended claims.

Having now particularly described my invention, what I desire to secure by Letters Patent of the United States and what I claim is:

1. In a duplex type photographic copying apparatus for simultaneously photographing a document having obverse and reverse sides, the combination with a photographing station having a document plane, an exposure station adapted to receive light sensitive image recording means with an available image area thereon, and means for reflecting images of said obverse and said reverse sides to said exposure station, of a three-lens system comprising a first lens for transmitting one said reflected image of each of said obverse and said reverse sides to said exposure station in non-overlapping relation thereat, a second lens for transmitting another said reflected image of said obverse side to said exposure station in side by side non-overlapping relation to said one reflected image of said reverse side thereat, and a third lens for transmitting another said reflected image of said reverse side to said exposure station in side by side non-overlapping relation to said one reflected image of said obverse side thereat transmitted by said first lens, said lenses each having an axis, said axis of each said lens being parallel to said axis of each other said lens, said axes all lying in a common plane perpendicular to said document plane, said lenses being so positioned and arranged with respect to said photographing station and to said exposure station that the total width of said available image area is only slightly less than the total width of said recording means.

2. In a duplex type photographic copying apparatus the combination with a photographing station having a document plane for receiving a document having obverse and reverse sides, an exposure station for receiving first and second parallel light-sensitive image recording means with available image areas thereon, and reflecting means on opposite sides of and obliquely disposed with respect to said photographing station for reflecting images of said obverse and said reverse sides to said exposure station, of a three-lens system comprising a first lens for transmitting one said obverse side image to said exposure station at the position occupied by said first recording means and one said reverse side image to said exposure station at the position occupied by said second recording means, a second lens for transmitting another said obverse side image to said exposure station at the position occupied by said second recording means in side by side non-overlapping relation to said one reverse side image thereat, and a third lens for transmitting another said reverse side image to said exposure station at the position occupied by said first recording means in side by side non-overlapping relation to said one obverse side image thereat, each said lens having an axis, said axes being parallel to each other and lying in a common plane perpendicular to said document plane, said lenses being so positioned and arranged with respect to said photographing station and to said exposure station that the total width of said available image areas is only slightly less than the total width of said first and said second recording means.

3. In a duplex type photographic copying apparatus the combination with a photographing station having a document plane for receiving a document having obverse and reverse sides, an exposure station for receiving light-sensitive image recording means with an available image area thereon, and reflecting means on opposite sides of and obliquely disposed with respect to said photographing station for reflecting images of said obverse and reverse sides to said exposure station, of a three-lens system comprising a first lens for transmitting one said reflected image of each of said obverse and said reverse sides to said exposure station in non-overlapping rotation thereat and having an axis lying in said document plane, a second lens for transmitting another said reflected image of said obverse side to said exposure station in side by side non-overlapping relation to said one reverse side image thereat and having an axis parallel to said first lens axis, and a third lens for transmitting another said reflected image of said reverse side to said exposure station in side by side non-overlapping relation to said one obverse side image thereat thansmitted by said first lens and having an axis parallel to said first axis, said axes of said lenses lying in a common plane perpendicular to said document plane, said lenses being so positioned and arranged with respect to said photographing station and to said exposure station that the total width of said available image area is only slightly less than the total width of said recording means.

No references cited.